United States Patent
Bonen

(10) Patent No.: US 11,320,882 B2
(45) Date of Patent: May 3, 2022

(54) R-PHY NODE WITH UPS TO ADDRESS CABLE SERVICE INTERRUPTIONS DUE TO SHORT POWER INTERRUPTIONS

(71) Applicant: Harmonic, Inc., San Jose, CA (US)

(72) Inventor: Adi Bonen, Belle Mead, NJ (US)

(73) Assignee: Harmonic, Inc., San Jose, CA (US)

( * ) Notice: Subject to any disclaimer, the term of this patent is extended or adjusted under 35 U.S.C. 154(b) by 148 days.

(21) Appl. No.: 16/666,913

(22) Filed: Oct. 29, 2019

(65) Prior Publication Data

US 2020/0133370 A1 Apr. 30, 2020

Related U.S. Application Data

(60) Provisional application No. 62/752,921, filed on Oct. 30, 2018.

(51) Int. Cl.
*G06F 1/28* (2006.01)
*G06F 1/16* (2006.01)
*G06F 1/30* (2006.01)

(52) U.S. Cl.
CPC ............ *G06F 1/305* (2013.01); *G06F 1/1635* (2013.01); *G06F 1/28* (2013.01)

(58) Field of Classification Search
CPC .......... G06F 1/305; G06F 1/1635; G06F 1/28; G06F 1/30; G06F 6/4446; H02J 7/007194; H02J 7/345; H02J 9/061; H05K 7/186
See application file for complete search history.

(56) References Cited

U.S. PATENT DOCUMENTS

| | | | | |
|---|---|---|---|---|
| 6,028,916 A * | 2/2000 | Beveridge | ........... | H04M 19/001 379/56.2 |
| 7,660,409 B1 * | 2/2010 | Czerwiec | .............. | H04M 1/003 379/413.02 |
| 10,599,201 B1 * | 3/2020 | Bonen | .................... | G06F 11/076 |
| 2002/0153778 A1 * | 10/2002 | Oughton, Jr. | ......... | H02M 5/458 307/64 |
| 2005/0086543 A1 * | 4/2005 | Manuell | .............. | G06F 11/3006 713/300 |
| 2005/0086544 A1 * | 4/2005 | Egan | ......................... | G06F 1/30 713/300 |
| 2007/0145828 A1 * | 6/2007 | Taylor | .................... | H04L 12/10 307/64 |
| 2010/0072819 A1 * | 3/2010 | Lee | ...................... | H02M 3/1582 307/77 |

(Continued)

*Primary Examiner* — Danny Chan
(74) *Attorney, Agent, or Firm* — Brokaw Patent Law PC; Christopher J. Brokaw

(57) ABSTRACT

A Remote PHY (R-PHY) node having a specialized Uninterruptible Power Supply (UPS). A R-PHY node comprises a coaxial cable input, one or more Remote PHY (R-PHY) devices, a node power supply designed to supply an entirety of the R-PHY node with power continuously while there is Quasi Square Wave (QSW) AC power supplied to the R-PHY node over the coaxial cable input, and an UPS for supplying power to either the entirety of the R-PHY node or a set of the one or more R-PHY devices when the R-PHY node is not supplied QSW power over the coaxial cable input. The internal UPS adjusts how power is supplied in response to determining that a configurable amount of time has passed since the interruption in QSW power to the R-PHY node.

26 Claims, 7 Drawing Sheets

(56) References Cited

U.S. PATENT DOCUMENTS

| | | | |
|---|---|---|---|
| 2010/0150556 A1* | 6/2010 | Soto | H04M 19/08 |
| | | | 398/66 |
| 2014/0015321 A1* | 1/2014 | Nordin | H02J 1/00 |
| | | | 307/43 |
| 2015/0142345 A1* | 5/2015 | Anderson | H04H 20/12 |
| | | | 702/59 |
| 2015/0363132 A1* | 12/2015 | Uehara | G06F 11/1441 |
| | | | 711/154 |
| 2016/0054771 A1* | 2/2016 | Fallon | G06F 1/26 |
| | | | 713/300 |
| 2016/0172901 A1* | 6/2016 | Hsieh | G01R 31/382 |
| | | | 307/66 |
| 2016/0172902 A1* | 6/2016 | Battat | H02J 7/0044 |
| | | | 307/65 |
| 2017/0250732 A1* | 8/2017 | Bowler | H04B 3/542 |
| 2019/0280520 A1* | 9/2019 | Zhang | H02J 9/062 |

* cited by examiner

R-PHY NODE WITH UPS TO ADDRESS CABLE SERVICE INTERRUPTIONS DUE TO SHORT POWER INTERRUPTIONS

CLAIM OF PRIORITY

The present application claims priority to U.S. provisional patent application No. 62/752,921, entitled "R-PHY Node With UPS To Prevent or Reduce Cable Service Interruptions Due to Short Power Interruptions," filed Oct. 30, 2018, the disclosure of which is hereby incorporated by reference for all purposes in its entirety as if fully set forth herein.

FIELD OF THE INVENTION

Embodiments of the invention generally relate to addressing cable service interruptions due to short power interruptions experienced by cable television equipment.

BACKGROUND

Cable television (CATV) equipment, such as a Remote PHY node, is powered by quasi-square-wave (QSW) AC power, which is carried by the same coaxial cable that carries the RF signal delivered to and from subscribers in a cable television system. Older CATV systems were limited to 60V QSW, while newer CATV systems often support 90V QSW, which enables a higher power transfer to devices (such as nodes, CATV amplifiers, Wi-Fi hot spots, and the like) connected to the coax distribution network.

Both the AC and the RF signals often travel through a coax distribution network that is composed of a chain of RF taps that are connected together by a length of coaxial hardline cable. These RF taps are used to tap some of the RF signal carried by the hardline coaxial cable and provide the tapped RF signal to drop cables which convey the tapped RF signal to subscribers' homes.

Taps are occasionally opened and maintained by cable technicians for various maintenance, repair, and testing tasks. The construction of these taps is such that the RF electronic circuitry that perform the bulk of its functionality is physically contained on a removable "face plate" of the tap rather than affixed within its base chassis. This enables easy replacement of the tap's electronic circuitry when the need arises without a need to splice a new tap to the hardline coaxial cable.

However, opening and removing the face plate of these taps causes an interruption in the signal path that travels in and out of the tap face plate and then continues to travel through the tap chain, thereby disconnecting both the RF signal and the QSW AC power from the rest of the chain. To solve this potential problem when tap face plates are removed, the taps are designed with a "make-before-brake" alternative path in the tap chassis. The mechanical action of removing the tap face plate causes disengagement of the signal path from the RF electronic part included in the face plate and the replacement of the signal path with an alternative path inside the tap chassis to provide continuity of the RF signal and the QSW AC power to the rest of the cable distribution network. The term make-before-brake signified that, during the removal of the tap face plate, the alternative path is established before the main path is removed, allowing the RF signal and the QSW AC power to flow through the tap before, during and after the removal operation. Similarly, during the reinsertion of the tap face plate, the main path is established before the alternative path is removed, allowing the RF signal and the QSW AC power to flow through the tap before, during and after the reinsertion operation.

Unfortunately, quite often the make-before-brake mechanism in the tap does not operate as intended. This can happen when the tap face plate is removed while slightly askew, which causes one of the tap face plate's two connections (i.e., the in port or the out port) to disengage from the tap chassis before the other connection is disengaged. This sequential disengagement can cause a very short interruption, typically lasting in the order of several hundreds of milliseconds, in the RF signal and the QSW AC propagation through the tap chain. As a result, an active CATV device which is being powered by the QSW AC power propagating through the tap chain will experience a short interruption of power, and will often lose its ability to operate for a short period, corresponding to the length of interruption plus a recovery time once the QSW AC power is restored.

In a traditional analog cable distribution system (i.e., a cable distribution system existing prior to the use and inclusion of sophisticated CPU embedded signal processing elements in the outside plant portion of the system), such an interruption caused by removing a tap face plate would typically cause the delivery of cable services to customers to be interrupted for less than a second. The traditional analog cable system equipment that is installed at the customer premises is designed to "survive" such interruptions without having much, if any, lasting ramifications. A user may experience a very short "tiling" on his TV screen, an almost unnoticeable momentary slowdown in Internet access, or a very short brake in audio during a call using a cable connected telephone, but all these will disappear after a second or so.

However, when CPU-embedded signal processing devices, which may be installed on the cable distribution plant, experience a similar such split-second interruption in their QSW AC powering source, these CPU-embedded devices often require several minutes to recover from such a power interruption, which is far more noticeable to customers. Cable services delivered to customers through them will often suffer corresponding long periods of interruption even if the source power interruption was just several hundreds of milliseconds.

The line power supply that shapes and feeds the QSW power to the coax distribution network is designed to provide various protection and safety mechanisms. Among these protection mechanisms, the line power supply limits the maximum current that can be withdrawn by the cable plant. Specifically, when the amount of current withdrawn is too high, the line power supply can reduce the QSW voltage. In more extreme cases of high current withdraw lasting several seconds (such as when a short circuit is applied somewhere to the coax), the line power supply may remove its output voltage completely from the coax distribution network, which typically results in the loss of all cable services provided through the coax distribution network.

Since the loss of services is a severe adverse effect, the line power supply is required by design to try and resume the delivery of power to the coax distribution network. This is done to enable the recovery of CATV devices when the issue that caused the high current withdraw was only temporary and is no longer present, and to prevent the need for a manual maintenance and repair action that may take a substantial time to commence (typically an hour or more). The line power supply is typically designed to try to resume normal operation every configurable length of time that can range over several seconds to several minutes.

Thus, a technician working on a part of the coax distribution network has the potential to cause a momentary electrical short, which, if lasting less than a few seconds, will typically cause loss of QSW AC power for a similar time, while a short circuit that lasts longer will typically cause the line power supply to protect the CATV system from excessive current by removing the QSW power from the coax distribution network for the configured length of time. When the coax distribution network is driven by traditional HFC equipment and nodes, the resulting service interruption to subscribers is often limited to the same several seconds or minutes as well, although some customer premises equipment (CPE), such as cable modems, will be required to register to the cable operators network again after cable signals are resumed, resulting in a loss of service that may last several minutes more than the power interruption itself.

Advanced systems, such as the CableLabs specified Remote-PHY system, offer many advantages to cable operators. Unfortunately, the R-PHY system introduces some disadvantages as well. One such disadvantage is the typical long restart process the R-PHY device (RPD) has to undergo when powered on, which includes a software boot process, a network authentication process, obtaining an Internet Protocol (IP) address, a timing synchronization process, registering with the R-PHY system, a configuration process, and turning on services. As a result, even a short split second power interruption which causes a similar split second interruption of cable services in a traditional hybrid fiber-coaxial (HFC) cable network can cause as much as 10 minutes of cable services interruption when these services are delivered by an RPD or an R-MACPHY device (RMD).

In certain contexts, a battery powered Uninterruptible Power Supply (UPS) may be used to prevent service interruption and data corruption and loss. Indeed, the line power supplies that provide the QSW power to the coax distribution network often employ large batteries to provide backup power when the source power is lost. The amount of stored power in such backup systems is typically devised such that it is sufficient to allow the cable operator time to deploy a portable generator to the location of the line power supply before the energy stored in the backup batteries is exhausted.

However, such battery powered UPS systems do not provide any benefit whatsoever when there is an interruption due to tap face plate removal or a momentary short on the coax distribution network. Moreover, battery powered UPS systems are not always employed, and in some cases, a battery powered UPS system may fail to engage. Thus, the harmful effects caused by a short momentary interruption on the utility power system are often not addressed or mitigated by the prior art use of battery powered UPS systems.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for a Remote PHY (R-PHY) node having a specialized Uninterruptible Power Supply (UPS) capable of addressing a short interruption in power are presented herein. In the following description, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Overview

Embodiments of the invention provide for a power backup system that can maintain a Remote-PHY Node (RPN) continuously active and operational during a power interruption caused by such events as a tap face plate removal. Other embodiments of the invention provide for a power backup system that can maintain a Remote-PHY Device (RPD) continuously active and partly operational during a power interruption, while the rest of the system is unpowered, to minimize the duration of service outage time. Prior art power backup systems are not directed towards this goal and are typically positioned where they cannot protect against such events as a tap face plate removal.

Moreover, prior art backup systems are designed to supply backup power for the whole system, and not just for key components within the system, such as the RPD. Further, prior art backup systems are designed to supply backup power for longer interruptions in power, and as such, prior art backup systems typically require several orders of magnitude higher power reserves than the amount of power required to maintain an RPD operational over a short duration.

Beneficially, embodiments of the invention provide alternative partial power to an RPN during an interruption in the main power supplied to the RPN that lasts for a short interval, e.g., several minutes. This alternate partial power may be supplied at a level sufficient to maintain an RPD at least partially operational and able to communicate with other parts of the remote PHY system, thereby allowing the system to recover almost immediately when the supply of main power does resume.

Remote PHY Node Architecture

Figure 1A:
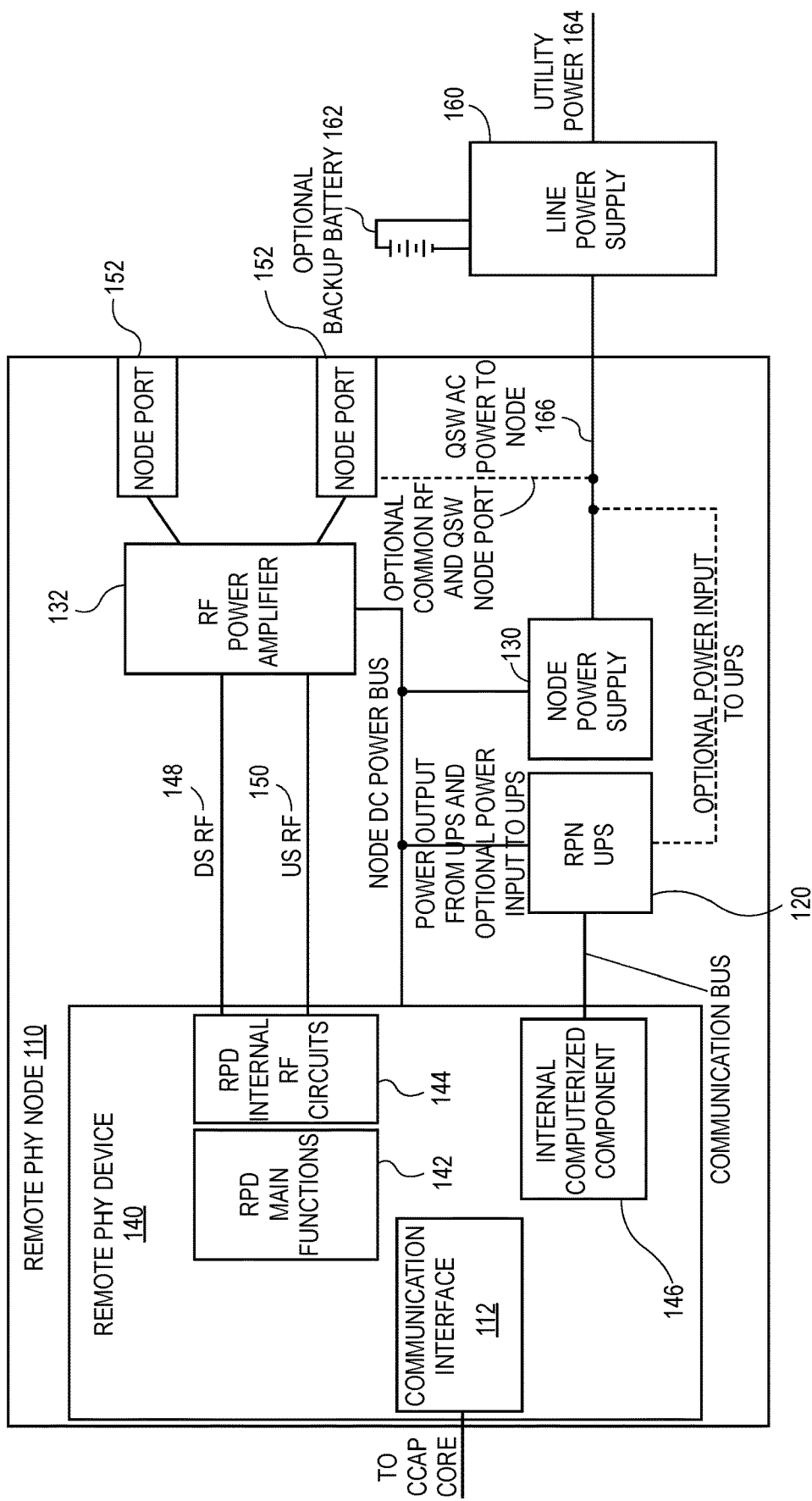
FIG. 1A is a block diagram of a specialized Uninterruptible Power Supply (UPS) implemented within a Remote PHY node (RPN) in accordance with an embodiment of the invention.

FIG. 1A is a block diagram of a specialized Uninterruptible Power Supply (UPS) 120 implemented within a Remote PHY node (RPN) 110 in accordance with an embodiment of the invention. FIG. 1 depicts RPN 110 coupled to line power supply 160. Line power supply 160 may, but need not, employ optional backup battery 162, which is responsible for providing backup power to line power supply 160 for a limited duration if utility power 164 becomes unavailable.

The function of RPN 110 is to convert downstream DOCSIS data, MPEG video, and out-of-band (OOB) signals from digital to analog one way and transmit them over a plurality of coaxial cables leading to cable subscribers' homes, and receive upstream data, video, and OOB signals from coaxial cables in analog format and convert them to digital the other way. The coaxial cables carrying the RF signals exchanged between RPN 110 and cable subscriber's homes are coupled to RPN 110 at node ports 152. In some cases, one of the coax interfaces used to convey the RF signals exchanged between RPN 110 and cable subscriber's homes may be used also to convey the QSW AC power to node 166. This option is depicted in FIG. 1A using a dotted line.

The digital data transmissions that are exchanged between the CCAP Core and communication interface 112 of RPD 140, comprised within RPN 110, are typically exchanged over digital fiber. RPD main functions 142 of RPN 110 converts said sent and received data transmissions from and to RF signals conveyed through RPD internal RF circuits 144. FIG. 1 depicts RPD internal RF circuits 144 of RPD 140 sending downstream RF signals as DS RF 148 and receiving upstream RF signals as US RF 150 through RF power amplifier 132 and from there to node ports 152.

Remote PHY nodes, such as RPN 110, are designed to be deployed outdoors near the physical area to be serviced by RPN 110. A non-limiting, illustrative example of RPN 110 includes Harmonic, Inc.'s CableOS™ Ripple-1 Remote PHY node.

RPN 110 is composed of an outer housing that surrounds at least one power supply 130 and at least one Remote Device (RPD) 140. The outer housing of RPN 110 is designed to provide a hermetically sealed environment to the interior of RPN 110. The hermetically sealed environment provided by the outer housing of RPN 110 helps protect internal components such as power supply 130 and RPD 140 from outdoor environmental factors, such as humidity, water, debris, and changes in pressure.

Communication interface 112 of RPN 110 may comprise an optical network transceiver (SFP), but embodiments may also be employed in contexts where access to other types of communication interface, such as a wireless network, instead of or in addition to the optical network, is available. In addition to data transmitted through RPN 110 to and from cable subscribers, and in addition to communications required to fulfill the operation of the RPD Main Functions 142, Internal Computerized Component 146 of RPD 140 may send and receive data communications over the optical network (or over a wireless network in contexts where such a network is available). This advantageously allows an operator or technician to send and receive data to RPN 110 deployed in the field, such as for purposes of configuring the operation of RPN 110, providing additional or revised data or executable instructions to RPN 110, and/or receiving information for monitoring various aspect of RPN 110 and its internal components.

Figure 1B:
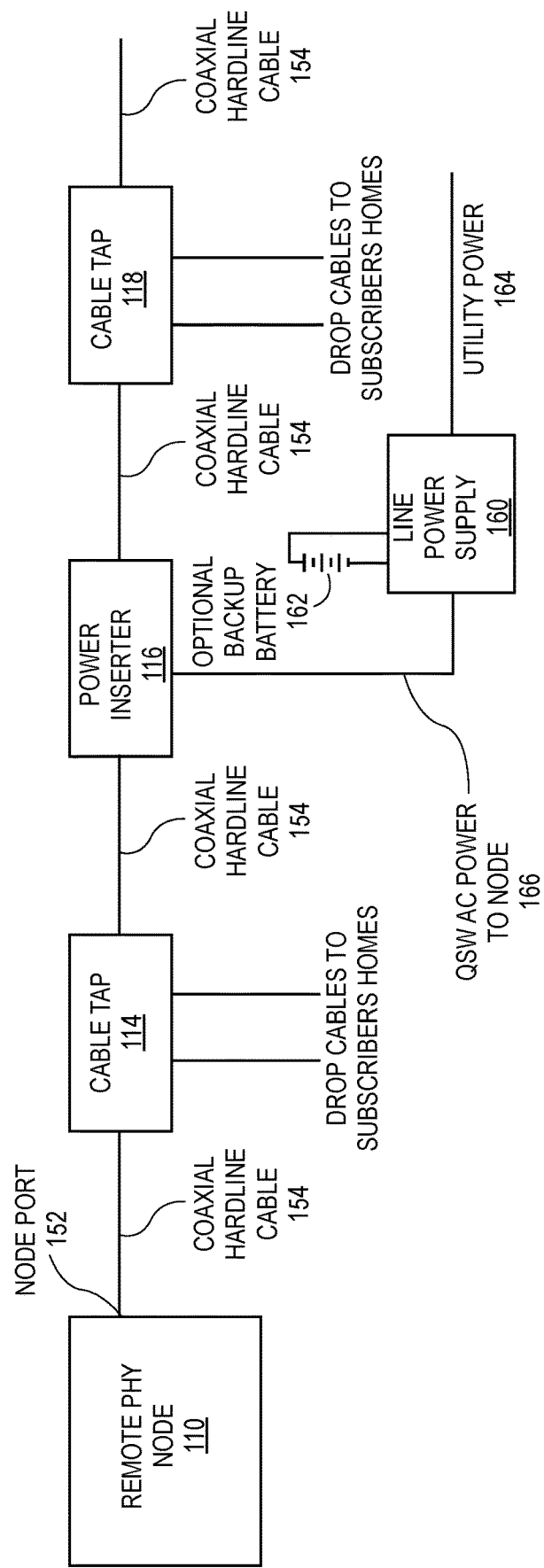
FIG. 1B is a block diagram of a portion of the cable plant depicting a possible QSW AC power coupling into a Remote PHY node (RPN) in accordance with an embodiment of the invention.

FIG. 1B is a block diagram of a portion of the cable plant depicting a possible QSW AC power coupling into a Remote PHY node (RPN) in accordance with an embodiment of the invention. QSW AC power to node 166 from line power supply 160 is inserted into the coaxial hardline cable 154 by power inserter 116, and passed by cable tap 114 to RPN 110 into the same node ports 152 used to convey the RF signals exchanged between RPN 110 and cable subscriber's homes. A removal of the face plate of cable tap 114 may cause a short interruption of power experienced by RPN 110 which cannot be protected by optional backup battery 162 of line power supply 160.

While embodiments shall chiefly be described with reference to concreate examples involving a RPD or equipment supported by a RPD, other embodiments of the invention may be employed in other contexts. Embodiments may be used in a wide variety of modern HFC equipment, including but not limited a RPD or a R-MACPHY device (RMD). Other embodiments, as shall be explained below, may be deployed in technical contexts other than CATV systems, such as in hospital equipment, first responder computer equipment, and computer equipment powered primarily through renewable sources, such as solar, wind, and wave power.

Specialized RPN Uninterruptable Power Supply

Normally, line power supply 160 supplies QSW AC power to RPN 110. The QSW AC power received by RPN 110 is depicted in FIG. 1A and FIG. 1B and referred to herein as QSW AC power 166. Node power supply 130 is designed to supply the entirely of RPN 110 with continuous power while QSW AC power 166 is received by RPN 110 from line power supply 160.

RPN Uninterruptible Power Supply (UPS) 120 of an embodiment uses a small but agile energy storage medium, such as one or more batteries and/or one or more capacitors, and electronic circuits to produce a dual approach power backup to be employed when there is an interruption in QSW AC power 166. When an interruption occurs in QSW AC power 166, RPN UPS 120 of an embodiment may initially provide sufficient power to maintain the entirety of RPN 110 operational for a user configurable duration, which would typically range from about ten to twenty seconds. Since the entirety of RPN 110 is operational during the interruption in QSW AC power 166, cable services need not be interrupted at all, provided that no other essential device lost power as well.

In an embodiment, if the interruption in QSW AC power 166 exceeds that user-configured duration, then RPN UPS 120 may alter its behavior to accord with a "secondary mode," in which rather than supplying power sufficient to maintain the entirety of RPN 110 operational, RPN UPS 120 instead supplies power to a set of one or more selected R-PHY devices in RPN 110 sufficient to keep those R-PHY devices operational but not the remainder of the RPN 110. As a consequence, while RPN UPS 120 operates in this "secondary mode," the drain rate of the energy storage medium of the RPN UPS 120 is substantially lower, e.g., it is estimated that RPN UPS 120 may be able to provide power to keep RPD devices within RPN 110 operational for 10 minutes to one hour. This secondary mode may last until the energy storage medium of RPN UPS 120 is depleted, unless QSW AC power 166 resumes before that time. This secondary mode enables rapid services resumption once QSW AC power 166 is restored after an interruption.

Delivering Power Through the RPN

In an embodiment, RPN UPS 120 may comprise multiple energy storage media. For example, an embodiment may implement RPN UPS 120 such that one or more first energy storage media are used to deliver power to a single RPD or a configurable portion thereof and one or more second energy storage media are used to deliver power to the entirely of the RPN 110. Other embodiments may be designed to apportion the aggregate power provided by one or more energy storage media of RPN UPS 120 in a variety of differently configurable ways, e.g., the level of granularity may be such that some portion or percentage of power is apportioned to a particular set of one or more RPDs contained within RPN 110 or to a particular portion or components of those RPDs.

Figure 2:
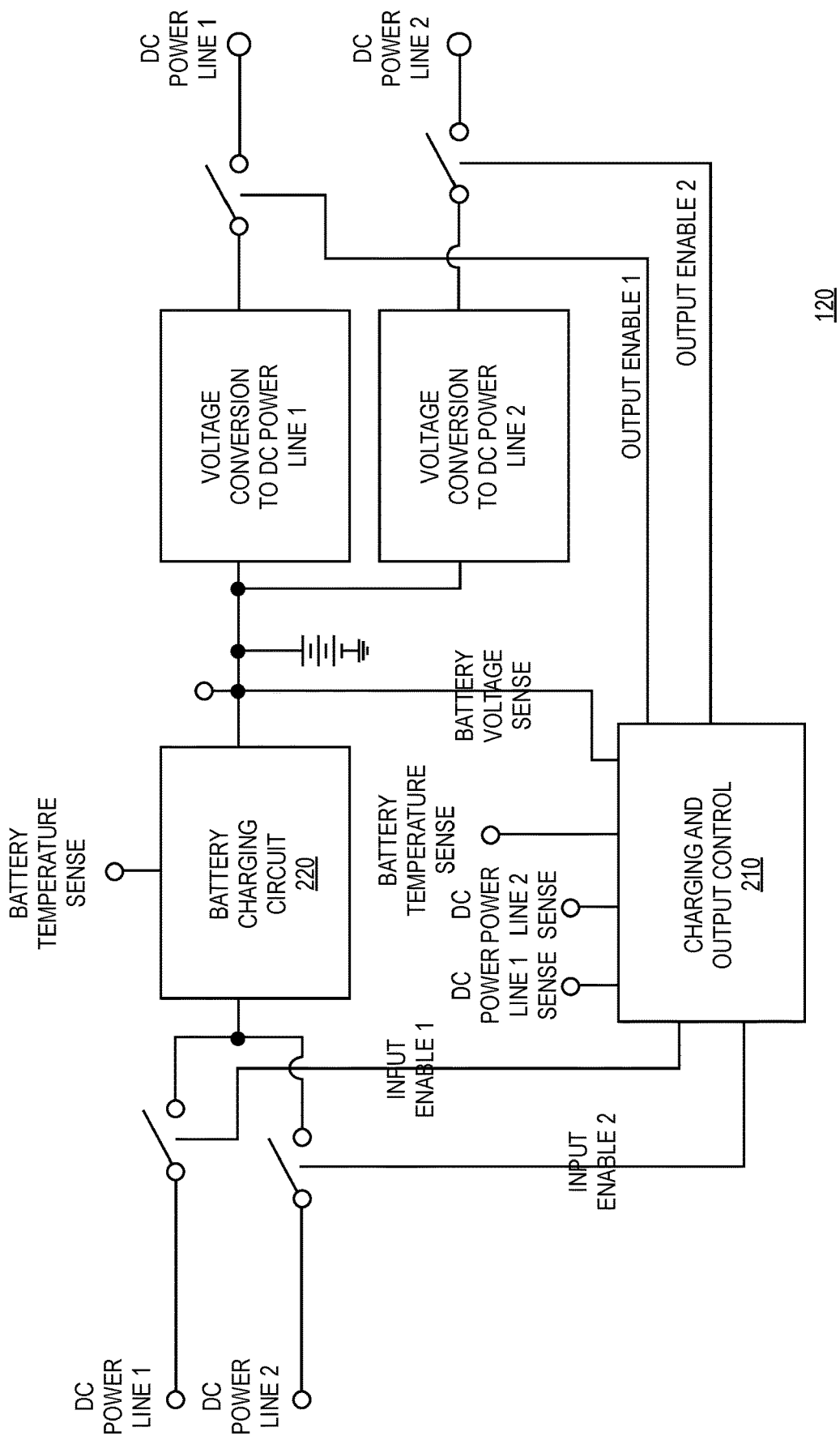
FIG. 2 is a block diagram of a RPN UPS that comprises separate power distribution lines according to an embodiment of the invention.

In an embodiment, power is delivered by RPN UPS 120 to various portions of RPN 110 using separate power distribution lines from each power source to the separate power consumers inside RPN 110, such as without limitation a RF launch amplifier and a RPD. FIG. 2 is a block diagram of RPN UPS 120 that comprises separate power distribution lines according to an embodiment of the invention. As shown in FIG. 2, there are separate power distribution lines, namely DC power line 1 and 2. DC power line 1 may be the DC power line which is normally active when QSW AC power 166 is active and used to power RPN 110. DC power line 1 is used by node power supply 120 or by RPN UPS 120 to power all parts of RPN 110. DC power line 2 may be used to power only the RPD 140 of RPN 110. Charging and output control 210 of RPN USP 120 can couple DC power line 1 to battery charging circuit 220 by issuing input enable 1 control signal. When QSW AC power 166 is interrupted, charging and output control 210 of RPN USP 120 can supply power to DC power line 1 for a short period of time by using control signal output enable 1; thereafter, charging and output control 210 can supply power to DC power line 2 by issuing output enable 2 until the RPN UPS 210 energy storage medium is exhausted or until QSW AC power 166 is restored.

Alternatively, the RPN may be designed with two power lines reaching all components, where some devices (e.g., a RF launch amplifier) can be configured to use only the main power line, and other devices (e.g., the RPD) can be configured to use either the main power line or the secondary power line when the main power line is not active.

In an embodiment, RPN UPS 120 supplies power to the entirety of RPN 110 using lower voltage and/or lower bias conditions or both than compared to the power supplied to the R-PHY devices within RPN 110. This embodiment is advantageous because it extends the lifetime of the energy storage medium of RPN UPS 120, although potentially at the expense of deterioration in RPN 110 performance.

Recharging the Battery of the UPS

In an embodiment, RPN UPS 120 may recharge its energy storage medium after QSW AC power 166 has been restored after an interruption during which RPN USP 120 supplied power to various components of RPN 110. The recharge rate for the energy storage medium of RPN UPS 120 should be a sufficiently slow rate so that the recharging of the energy storage medium does not pose a significant drain on QSW AC power 166 or on node power supply 130. It may require several hours to as much as a full day to charge the energy storage medium of RPN UPS 120 using QSW AC power 166, depending on the magnitude of energy storage medium depletion during the interruption in QSW AC power 166. Also, a user may impose a configurable restriction to prevent the energy storage medium of RPN UPS 120 from drawing more than a certain rate of power from QSW AC power 166 to prevent an excessive drain rate thereupon. Charging the energy storage medium of RPN USP 120 in this fashion prepares the energy storage medium and RPN UPS 120 for the next interruption in QSW AC power 166.

The charge used to recharge the energy storage medium of RPN UPS 120 may be supplied from the same internal DC power bus that RPN UPS 120 delivers power to during a discharge operation. Alternatively, RPN UPS 120 can be recharged directly from the QSW AC power 166 input to RPN 110. For example, FIG. 1 depicts this optional approach for recharging RPN UPS 120 as a dotted line from RPN UPS 120 to QSW AC power 166.

Embodiments of the invention may use temperature measurements obtained on or near the energy storage medium of RPN UPS 120 to control and influence the charging process. FIG. 2 depicts battery temperature sensors deployed at or near the battery of RPN UPS 120. During the charging process, it is possible to modify the voltage of that recharge process. Embodiments may lower the voltage of the recharge process when the temperature of the energy storage medium is too high to prolong the lifespan of the energy storage medium. Embodiments of the invention may also suspend charging operations when the temperature of the energy storage medium become either too low or too high until the energy storage medium temperature is within a permissible temperature range to increase energy storage medium lifespan.

In an embodiment, RPN UPS 120 may signal to RPD 140 to turn off or power down portions of its electronic circuitry which are essential for the complete operation of the R-PHY system, but are not required when RPD 140 is just preserving its configuration and maintaining communication with the rest of the R-PHY system. Examples for such include, without limitation, internal RF amplifiers and other RF circuitry as well as circuitry which is used for communicating with other parts of the RPN.

Figure 3:
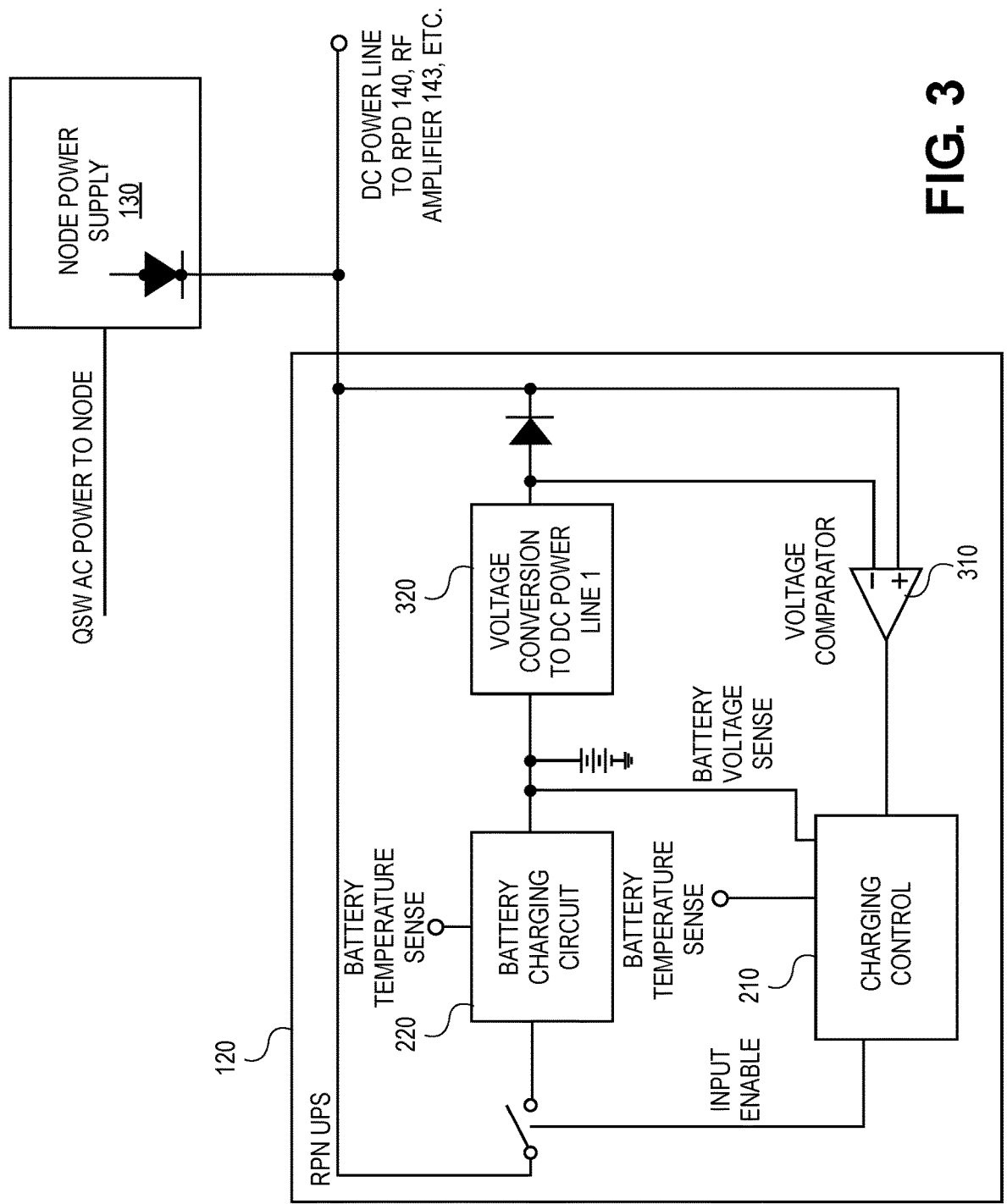
FIG. 3 is an illustration of a simplified RPN UPS with a single power line connected in accordance with an embodiment of the invention.

FIG. 3 is an illustration of a simplified RPN UPS 120 with a single power line connected in accordance with an embodiment of the invention. While node power supply 130 is actively supplying power, RPN UPS 120 can charge its battery or other energy storage medium from this line as needed. The output voltage of RPN UPS 120 is deliberately set slightly lower than the normal output voltage of node power supply 130 such that with the help of Orin diodes, node power supply 130 is the one providing power to the components of RPN 110. During such conditions as node power supply 130 is supplied QSW AC power 166, RPN UPS 120 can charge its battery from the DC power line as needed.

When QSW AC power 166 is interrupted, node power supply 130 is unable to maintain the required DC power line voltage. With the help of the ORing diodes, RPN UPS 120 may assume responsibility for providing power to the components of RPN 110. Charging control circuit 210 may detect when QSW AC power 166 is interrupted by monitoring the output of voltage comparator 310, as an interruption in QSW AC power 166 will cause a reversal of the voltage polarity on the ORing diode inside RPN UPS 120 once RPN UPS 120 starts providing the node power. In response to QSW AC power 166 being interrupted, charging control circuit 210 halts the charging of the battery of RPN UPS 120.

When QSW AC power 166 is reinstated, node power supply 130 again resumes responsibility for providing power to components of RPN 110. Charging control circuit 210 detects that such had happen by monitoring the output of voltage comparator 310 and can reinitialize charging of the battery of RPN UPS 120.

Alternate Energy Storage Media of and Enabled by the UPS

One possible advantage of employing RPN UPS 120 is that it facilitates the use of smaller capacitors in node power supply 130. The size of capacitors used in node power supply 130 is often selected such that when QSW AC power 166 is unavailable due to a very short (i.e., several tens of milliseconds) interruption, the interruption in QSW AC power 166 is compensated for by the energy stored in electrolytic capacitors inside node power supply 130. These very short interruptions may exist in QSW AC power 166 due to power relay switching as the utility power company switches between sources of power over their network. Typically, node power supply 130 is designed to maintain its output power without deterioration when one or two cycles of the 60 Hz QSW AC power 166 are "missing." The existence of a secondary power backup in the form of RPN UPS 120 negates the need for this capability in node power supply 130, and the corresponding need for bigger electrolytic capacitors in node power supply 130, since RPN UPS 120 is able to provide the required power and maintain RPN 110 in a fully operational state during these very short interruptions in QSW AC power 166.

At the time of filing the present application, the Assignee has been unable to obtain batteries that meet the various requirements for serving as the backup power source of RPN UPS 120. Such requirements include the ability to provide a short term (e.g., about ten seconds) higher power delivery capacity, a longer term (e.g., about 10 minutes) lower power delivery capacity, an appropriate size to accommodate being positioned in the available space in the interior of RPN 110, the capability to be mounted in different orientations, the ability to withstand the extreme temperature range experienced by RPN 110 (the estimated temperature range of a battery inside RPN 110 is −40° C. to +70° C.), and the ability to provide assured operation over a the expected life span of the Remote-PHY node. It is nevertheless estimated that working with expert battery manufacturers that such batteries can be developed and manufactured, enabling the exploitation of the embodiments described herein.

In certain deployments, it may be impossible or inadvisable to employ RPN UPS 120 that uses a battery as its energy storage medium. This may be because an appropriate battery may not be available or may be too expensive (this would likely be the case in the near term for a battery that can operate over a required wide temperature range experienced by some RPNs for the expected life time of the RPN), or because the additional maintenance required to keep RPN UPS 120 operational over many years is undesirable.

Embodiments may address this issue by constructing RPN UPS 120 such that it uses one or more large or sufficiently sized capacitors as its energy storage media to supply backup power for a short period of time to essential elements of RPN 110. The physical size of a capacitor capable of providing the energy consumed by the entirety of RPN 100 during even a single second may be too large to fit inside the interior of RPN 110. Also, it is possible that the financial cost of such a capacitor may be too high for a practicable deployment. However, a substantially smaller and lower cost capacitor-based backup power system may be constructed and used to provide the energy required to power only the essential elements of RPD 140 itself. Those essential elements of RPD 140 may be powered by an estimated 20% of normal amount of power consumed by the entirety of RPD 140. This way, the essential elements of RPD 140 may be maintained operational and able to communicate with the R-PHY system. Thus, in a case of a very short interruption in QSW AC power 166 (e.g., an interruption in the order of several hundreds of milliseconds caused by a tap face plate removal), upon the return of QSW AC power 166, RPN 110 can immediately resume full operation, resulting in a very short cable services interruption similar to that of legacy CPU-less systems.

Figure 4:
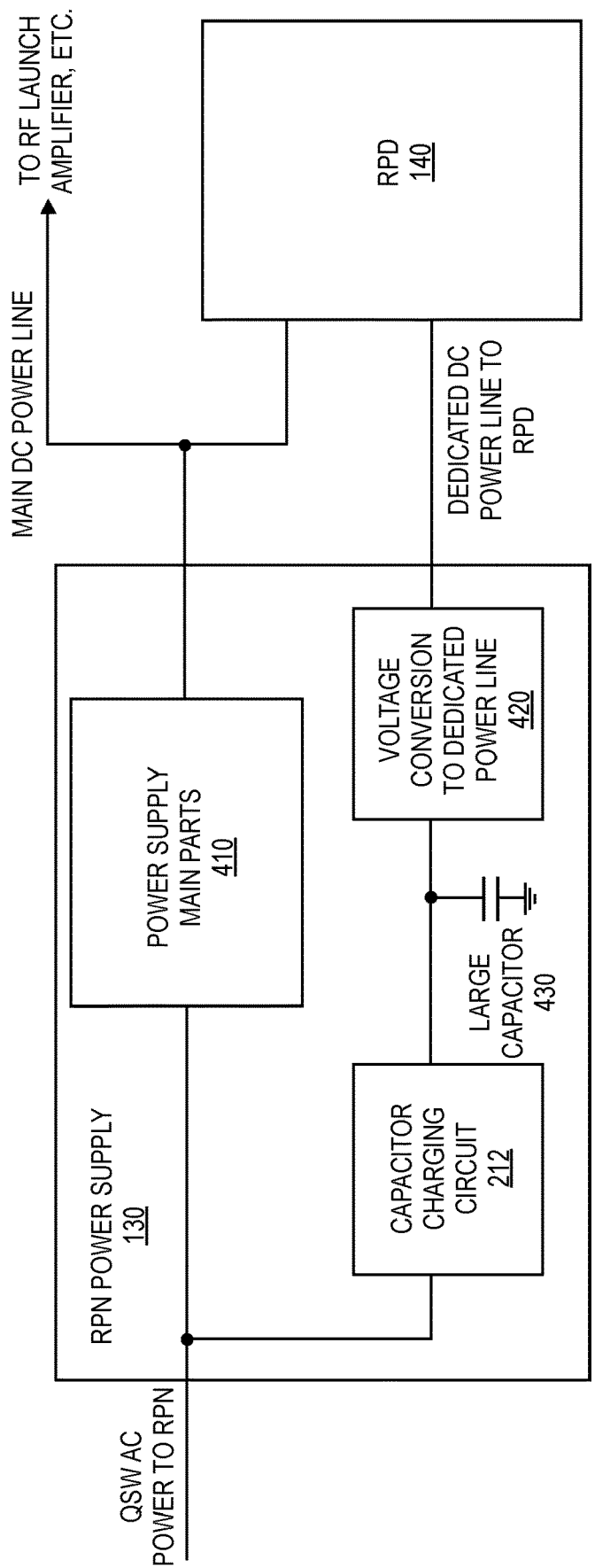
FIG. 4 is an illustration of a power supply, comprising a capacitor, that is used inside a RPN according to an embodiment of the invention.

In an embodiment, the required large capacitor(s) can be included in node power supply 130. FIG. 4 is an illustration of a power supply, comprising a capacitor, which is used inside a RPN according to an embodiment of the invention. Power supply main parts 410 of node power supply 130 may be configured to still supply its full output power capability for the required very short period of time (e.g., one QSW AC cycle time) as normal. After which, node power supply 130 stops supplying power to the entirety of RPN 110 and instead supplies power only to the entirety of RPD 140 or to only the essential parts of RPD 140 for additional time (e.g., about one second). In FIG. 4, capacitor charging circuit 212 is used to charge large capacitor 430 when QSW AC power 166 is active, and voltage conversion to dedicated power line 420 supplies power to RPD 140 through a dedicated DC power line to RPD. A mechanism may be used to detect when an interruption in QSW AC power 166 occurs to enable the operation of voltage conversion to dedicated power line 420. Alternatively, RPD 140 can be configured to only utilize the power from the dedicated DC power line to RPD when the main DC power line lost power.

In another embodiment, the required large capacitor(s) can be included in a secondary UPS module included in RPN 110, while node power supply 130 is left unchanged. Similar to a battery powered UPS, a capacitor powered UPS will only provide power once QSW AC power 166 is interrupted, the internal electrolytic capacitor of node power supply 130 is exhausted, and power supply 130 is no longer able to maintain its output power line active. A capacitor-based UPS of an embodiment will use its stored energy to supply power only to the entirety of RPD 140 or to the essential parts of RPD 140 for a short period of time (e.g., about one second) after the internal electrolytic capacitor of node power supply 130 becomes exhausted. RPN 110 may incorporate a dedicated means of delivering power from a capacitor-based UPS to the RPD only.

Figure 5:
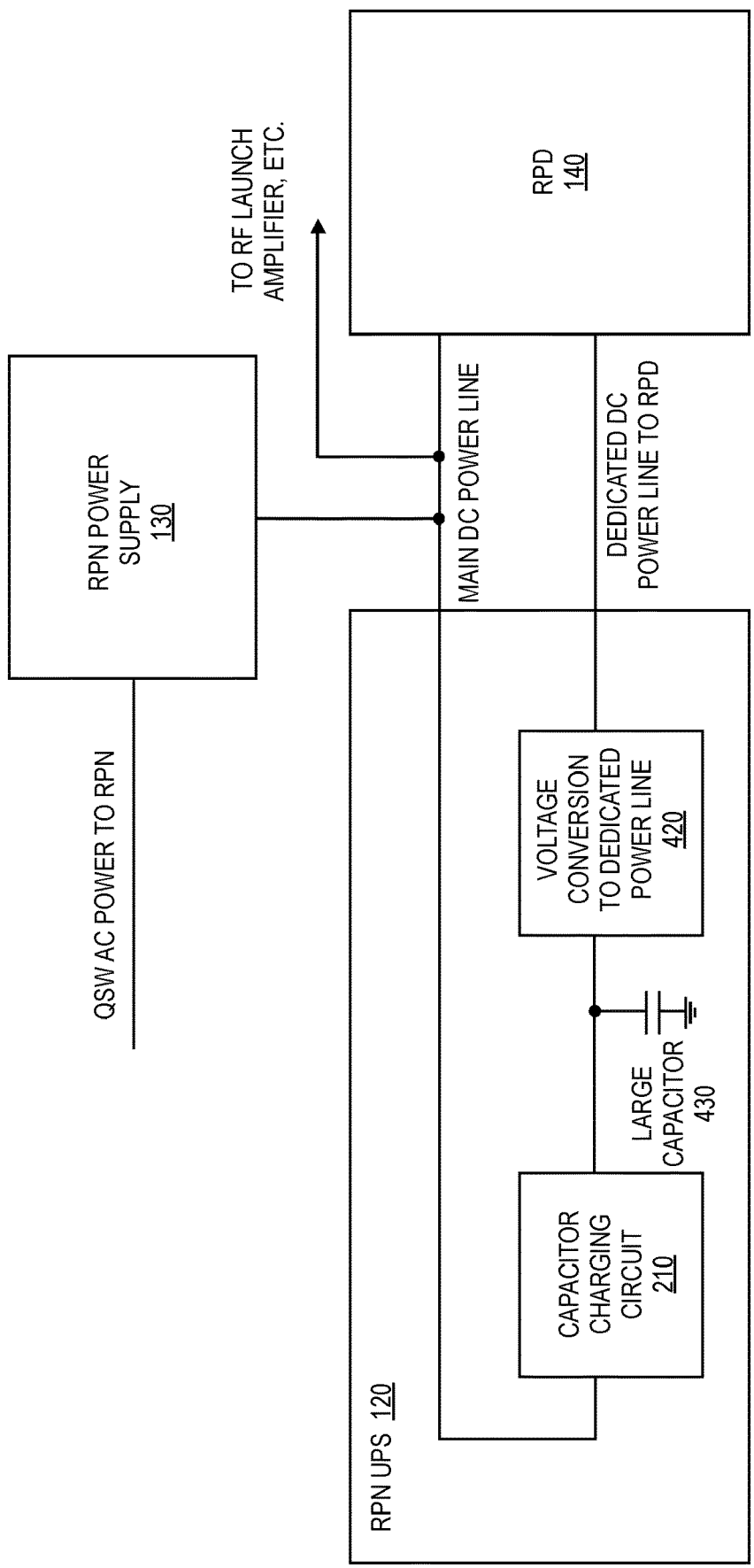
FIG. 5 is an illustration of a node power supply being dedicated to delivering power to the entirety of the RPN, while a RPN UPS is dedicated to delivering power only to the RPD according to an embodiment of the invention.

FIG. 5 is an illustration of node power supply 130 being dedicated to delivering power to the entirety of RPN 110, while RPN UPS 120 is dedicated to delivering power only to RPD 140 according to an embodiment of the invention. Capacitor charging circuit 210 uses the main DC power line to charge large capacitor 430 as long as RPN power supply 130 maintains its output power. Voltage conversion to dedicated power line 420 supplies power to RPD 140 through a dedicated DC power line to RPD 140. A mechanism may be used to detect when the main DC power line lost power to enable the operation of voltage conversion to dedicated power line 420. Alternatively, RPD 140 can be configured to only utilize the power from the dedicated DC power line to RPD 140 when the main DC power line lost power.

In an embodiment, an implementation of RPN UPS 120 that employs capacitor(s) as an energy storage medium may charge those capacitors either by receiving the QSW AC power 166 directly, or from the output line of node power supply 130. The charge of the capacitor should be implemented such that the rate of charge is much slower than the rate of discharge. In this way, the capacitor charging operation does not pose a significant drain or burden on QSW AC power 166 or on node power supply 130 respectively. For example, while the capacitor can be completely discharged in about one second, it could be set to recharge once QSW AC power 166 is available over a period of several minutes.

Node power supply 130 and RPN UPS 120 may incorporate multiple separate energy storage media. Each energy storage medium may, but need not, be dedicated to supplying power to a particular recipient. For example, one energy storage medium of node power supply 130 and RPN UPS 120 may be dedicated to delivery power to RPD 140, while another energy storage medium is dedicated to delivering power to the entirety of RPN 110. Energy storage media may deliver power by multiple and separate power distribution lines from node power supply 130 to the separate power consumers inside RPN 110 (such as, for example, a RF launch amplifier, RPD 140, and so on). Alternatively, node power supply 130 and RPN UPS 120 may be designed with two power lines reaching all components of RPN 110, where some devices in RPN 110 (e.g., the RF launch amplifier) can be configured to use only a main power line, and other devices in RPN 110 (e.g., RPD 140) can be configured to use either the main power line or the secondary power line when the main power line is not active.

Exemplary Use Case

Figure 6:
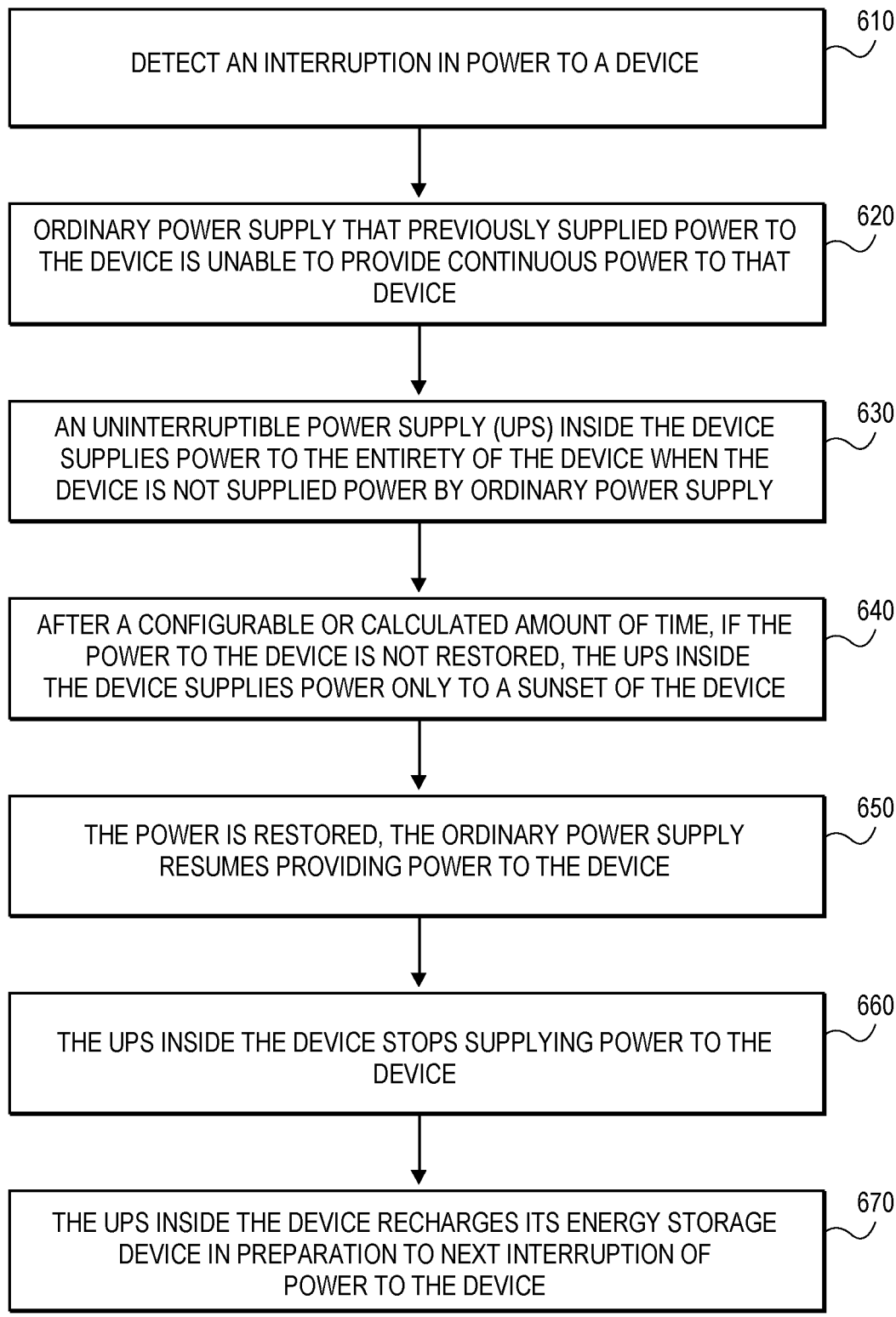
FIG. 6 is a flowchart illustrating the functional steps performed by an embodiment of the invention.

While embodiments have chiefly been described with respect to physical embodiments, the innovations described herein also encompass processes for using the embodiments described herein. FIG. 6 is a flowchart illustrating the functional steps performed by an embodiment of the invention. The process depicted in FIG. 6 may be performed upon a wide variety of devices.

Prior to the performance of the steps of FIG. 6, the device of FIG. 6 may be powered by a component that supplies continuous power. A non-limiting example of such a power supply is node power supply 130. Other types of power supplies may be used in other devices. For example, certain general-purpose computer systems as well as special purpose computer systems for communications, healthcare, and industrial applications employ a power supply responsible for providing continuous power thereto.

In step 610, an interruption in power to a device is detected. As discussed herein, there are several reasons why this may come to happen. Such as device that receives the interruption in power may correspond to RPN 110. However, embodiments of the invention are not restricted to implementation in a RPN 110, and may be employed in any technical context which it is necessary to ensure power is supplied to hardware and/or software, and such hardware and/or software may occasionally experience an interruption in power. Therefore, the device of step 610 may also include hospital equipment, portable equipment, and computer equipment powered by green energy, such as but not limited solar power, wind power, wave power, tidal power, and the like.

As a result of the performance of step 610, the power supply that previously supplied power to the device is unable to provide continuous power to that device. In response, step 620 is performed.

In step 620, an ordinary power supply that previously supplied power to the device is unable to provide continuous power to that device.

In step 630, an uninterruptible power supply (UPS) physically located inside the device supplies power to the entirety of the device when the device is not supplied power by the ordinary power supply.

In step 640, after a configurable or calculated amount of time, if the power to the device has not yet been restored, then the UPS inside the device supplies power to a subset of the device. The contents of that subset of the device may be preidentified using a configuration or be otherwise identified to the UPS so that the UPS is configured to provide power to only the identified subset of the device. Note that in certain embodiments of the invention, the UPS may identify various hierarchical levels of operation such that after a first amount of time, a small portion of the device is powered down, thereafter, after a second amount of time, a greater portion of the device is powered down. Indeed, embodiments may use any number of temporal thresholds that, when satisfied, trigger the powering down of any scope or portion of the device.

For example, in an embodiment where the device corresponds to a RPN, initially power may cease to be supplied to portions of the RPN, but a RPD comprised within the node may continue to receive full power. Sometime thereafter, even certain non-essential portions of the RPD may cease to receive power so that essential portions of the RPD may continue to receive power. If power to the device is not restored for an extended period of time, then all portions of the RPD, and the remainder of the RPN, may eventually cease to receive power.

In step 650, once power is restored to the device, the ordinary power supply resumes providing power to the device.

In step 660, the UPS inside the device ceases to supply power to the device.

Thereafter, in step 670, the UPS inside the device recharges its energy storage device in preparation of the next interruption in power to the device.

Extensions

Embodiments of the invention may incorporate approaches discussed in U.S. patent application Ser. No. 15/846,926 (the "'926 application"), filed on Dec. 19, 2017, entitled 'ESTIMATING A LIFESPAN OF A POWER SUPPLY,' and in U.S. patent application Ser. No. 15/846,989 (the "'989 application"), filed on Dec. 19, 2017, entitled 'DETECTING IMMINENT FAILURE IN A POWER SUPPLY,' the disclosures of both of which are incorporated by reference in their entirety for all purposes as if fully set forth herein.

As a battery or capacitor functioning as an energy storage medium of RPN UPS 120 is exposed to accumulated long term slight stress (standby at extreme temperatures) and repeated events of rapid discharge followed by charging to recover the spent energy, the battery or capacitor loses some of its capability to hold energy, such that its total capacity is diminished. Similar to the case with electrolytic capacitors described in the '926 application and the '989 application, the battery failure mode is often exponentially accelerated once it begins.

Using the approaches discussed within the '926 application, estimation of the battery and/or capacitor lifespan of the UPS (collectively the "energy storage medium" of the UPS) may be based on the temperatures experienced by the energy storage medium while in standby, charging, and discharging modes, the depth of each discharge event, and the number of such events. Similar to the electrolytic capacitors life remaining approach discussed in the '926 application, the initial life capacity of the energy storage medium of a UPS is reduced as time advances by the amount of accumulated stress applied to the energy storage medium.

Using the approaches discussed within the '989 application, the residual capacity of the energy storage medium of the UPS can be tested and measured by established means. When such periodical measurement indicates a reduction in energy storage medium capacity beyond acceptable deterioration, an alarm indication can be provided by RPD 140 as established in the process and framework of U.S. patent application Ser. No. 15/846,989.

Embodiments of the invention have chiefly been described with reference to use in conjunction with RPN 110. However, embodiments of the invention may also be employed in other technical contexts involving maintaining certain computer equipment operational for short periods of time when power to that electrical equipment is interrupted. Other embodiments of the invention may employ a UPS as described herein in technical contexts other than CATV systems, such as in hospital equipment, first responder computer equipment, and computer equipment powered primarily through renewable sources, such as solar, wind, and wave power.

In the foregoing specification, embodiments of the invention have been described with reference to numerous specific details that may vary from implementation to implementation. Thus, the sole and exclusive indicator of what is the invention and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A Remote PHY (R-PHY) node having a specialized Uninterruptible Power Supply (UPS), comprising:
   the R-PHY node comprising:
      a coaxial cable input;
      one or more Remote PHY (R-PHY) devices;
      a node power supply designed to supply an entirety of the R-PHY node with power continuously while there is quasi-square-wave (QSW) AC power supplied to the R-PHY node over the coaxial cable input; and
      an internal Uninterruptible Power Supply (UPS) for selectively switching a recipient of power supplied by the internal UPS between (a) the entirety of the R-PHY node and (b) a set of the one or more R-PHY devices comprised within the R-PHY node when the R-PHY node is not supplied QSW AC power over the coaxial cable input such that the recipient remains continuously operational during an interruption in power in said QSW AC power supplied to said R-PHY node over said coaxial cable input while said internal UPS possesses power, wherein the power source of the UPS consists of one or more capacitors and does not include a battery.

2. The R-PHY node of claim 1, wherein the internal UPS adjusts how power is supplied in response to determining that a configurable amount of time has passed since the interruption in QSW power to the R-PHY node.

3. The R-PHY node of claim 1, wherein the internal UPS adjusts how power is supplied between the entirety of the R-PHY node and the set of the one or more R-PHY devices.

4. The R-PHY node of claim 1, wherein the set of the one or more R-PHY devices may include any combination of the one or more Remote PHY (R-PHY) devices such that any permutation of the one or more Remote PHY (R-PHY) devices comprised within the R-PHY node may be independently configured to receive power by the internal UPS.

5. The R-PHY node of claim 1, wherein the R-PHY node comprises a first set of internal power distribution lines for delivering power to the entirety of the R-PHY node, and wherein the R-PHY node comprises a second set of internal power distribution lines, separate from the first set of internal power distribution lines, for delivering power to the set of the one or more R-PHY devices.

6. The R-PHY node of claim 1, wherein the internal UPS recharges from the QSW power supplied to the R-PHY node over the coaxial cable input when available.

7. The R-PHY node of claim 1, wherein the internal UPS recharges from power supplied by the node power supply.

8. The R-PHY node of claim 1, wherein the internal UPS employs a configuration used in determining how long to supply power to the entirety of the R-PHY node.

9. The R-PHY node of claim 1, wherein the internal UPS employs a configuration that adjusts the behavior of internal UPS, and wherein the configuration considers one or more of static power source characteristics, observed measurements of the power source, and observed environmental conditions of the R-PHY node.

10. The R-PHY node of claim 1, wherein the internal UPS informs at least one of the one or more Remote PHY (R-PHY) devices that portions of the R-PHY node will soon lose power to allow said at least one Remote R-PHY device to power-down certain components thereof.

11. The R-PHY node of claim 1, wherein the internal UPS comprises at least one capacitor, and wherein a lifespan of said at least one capacitor is determined by a computer component based, at least in part, upon temperatures measured at or near said at least one capacitor by said R-PHY node, and wherein said computer components resides internal or external to the R-PHY node.

12. The R-PHY node of claim 1, wherein the internal UPS comprises at least one capacitor, and wherein the internal UPS is capable of issuing a message, over a network, that indicates that said at least one capacitor is experiencing a reduced performance.

13. The R-PHY node of claim 1, wherein the internal UPS supplies power to the entirety of the R-PHY node at one or more of a lower voltage and lower bias conditions than compared to the power supplied to the set of the one or more R-PHY devices.

14. A method for ensuring power is supplied to at least a portion of a Remote PHY (R-PHY) node having a specialized Uninterruptible Power Supply (UPS), comprising:
   a node power supply supplying an entirety of the R-PHY node with power continuously while there is quasi-square-wave (QSW) AC power supplied to the R-PHY node over a coaxial cable input to the R-PHY node; and
   an internal Uninterruptible Power Supply (UPS) selectively switching a recipient of the power supplied by the internal UPS between (a) the entirety of the R-PHY node and (b) a set of the one or more R-PHY devices comprised within the R-PHY node when the R-PHY node is not supplied QSW AC power over the coaxial cable input such that the portion of the R-PHY node supplied power by the internal UPS remains continuously operational during an interruption in power in said QSW AC power supplied to said R-PHY node over said coaxial cable input while said internal UPS possesses power, wherein the power source of the UPS consists of one or more capacitors and does not include a battery.

15. The method of claim 14, wherein the internal UPS adjusts how power is supplied in response to determining that a configurable amount of time has passed since the interruption in QSW power to the R-PHY node.

16. The method of claim 14, wherein the R-PHY node comprises a first set of internal power distribution lines for delivering power to the entirety of the R-PHY node, and wherein the R-PHY node comprises a second set of internal power distribution lines, separate from the first set of internal power distribution lines, for delivering power to the set of the one or more R-PHY devices.

17. The method of claim 14, wherein the internal UPS informs at least one of the one or more Remote PHY (R-PHY) devices that portions of the R-PHY node will soon lose power to allow said at least one Remote R-PHY device to power-down certain components thereof.

18. The method of claim 14, wherein the internal UPS comprises at least one capacitor, and wherein a lifespan of said at least one capacitor is determined by a computer component based, at least in part, upon temperatures measured at or near said at least one capacitor by said R-PHY node, and wherein said computer components resides internal or external to the R-PHY node.

19. The method of claim 14, wherein the internal UPS adjusts how power is supplied between the entirety of the R-PHY node and the set of the one or more R-PHY devices.

20. The method of claim 14, wherein the set of the one or more R-PHY devices may include any combination of the one or more Remote PHY (R-PHY) devices such that any permutation of the one or more Remote PHY (R-PHY) devices comprised within the R-PHY node may be independently configured to receive power by the internal UPS.

21. The method of claim 14, wherein the internal UPS recharges from the QSW power supplied to the R-PHY node over the coaxial cable input when available.

22. The method of claim 14, wherein the internal UPS recharges from power supplied by the node power supply.

23. The method of claim 14, wherein the internal UPS employs a configuration used in determining how long to supply power to the entirety of the R-PHY node.

24. The method of claim 14, wherein the internal UPS employs a configuration that adjusts the behavior of internal UPS, and wherein the configuration considers one or more of static power source characteristics, observed measurements of the power source, and observed environmental conditions of the R-PHY node.

25. The method of claim 14, wherein the internal UPS comprises at least one capacitor, and wherein the internal UPS is capable of issuing a message, over a network, that indicates that said at least one capacitor is experiencing a reduced performance.

26. The method of claim 14, wherein the internal UPS supplies power to the entirety of the R-PHY node at one or more of a lower voltage and lower bias conditions than compared to the power supplied to the set of the one or more R-PHY devices.

* * * * *